F. RICHARDSON.
SANITARY TRAP.
APPLICATION FILED APR. 1, 1908.
921,460.
Patented May 11, 1909.
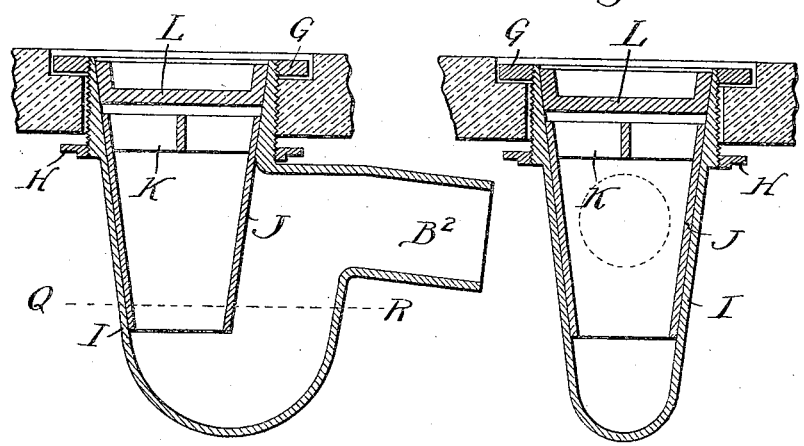
INVENTOR
Fred Richardson,
BY B. Singer
ATTORNEY
WITNESSES:

UNITED STATES PATENT OFFICE.

FRED RICHARDSON, OF CROYDON, ENGLAND.

SANITARY TRAP.

No. 921,460.  Specification of Letters Patent.  Patented May 11, 1909.

Application filed April 1, 1908. Serial No. 424,603.

*To all whom it may concern:*

Be it known that I, FRED RICHARDSON, a subject of the King of the United Kingdom of Great Britain and Ireland, and resident of Croydon, Surrey, England, have invented a certain new and useful Improvement in Sanitary Traps, of which the following is a specification.

This invention relates to an improved trap for sanitary purposes in which a hollow frusto-conical removable sleeve forms the division or central wall of the trap and the dip for the water seal.

The object of this invention is to provide a construction of trap of the self cleansing type, of such formation as to give direct access to the waste pipe from the mouth of the trap, and to provide for ready cleansing of the waste pipe, so that an unskilled person without the aid of implements can remove and replace the said sleeve; and to provide in conjunction with the trap casing a self adjusting slip joint so as to permit of the sleeve being removed and replaced as easily as an ordinary plug.

In the construction of the improved trap, I form the external casing in one piece entirely and without a division wall forming the seal between the inlet and outlet sections. The interior of the casing is formed as a plane surface without shoulders, offsets, insets or obstructions of any kind, no lengthening pieces such as ferrules, caps, screw tubes or flanges forming the top or mouth of the trap being required, and the jointing of such ferrules, caps, screw tubes, or flanges inside the trap being avoided. The interior of the casing is made with an enlarged mouth, tapering downward, the base of the casing being made semicircular in form both longitudinally and transversely. The top of the outlet section is formed at right angles to the inlet for giving access to the waste-pipe, and the outside of the casing at the top from the waste-pipe connection upward is made vertical. If the casing is required to be fixed to a vessel, the vertical part of the casing is screw-threaded. The upper part of the inside of the casing will be ground to have a true conical shaped surface, so as to form the seating for a slip joint formed on the removable sleeve and for a plug if required. To separate the inlet portion from the outlet portion of the casing, I fit a removable dip in the form of a hollow frusto-conical sleeve in the body of the trap; the upper part of this sleeve on its outside being ground to have a true conical shaped surface so as to engage the true formed surface on the inside of the casing, and to form a self adjusting and watertight joint. The sleeve when placed in the mouth of the casing forms in part an inner lining adjacent to the trap casing and in part a removable partition shutting off the waste pipe from the mouth of the trap so that no filth or refuse can collect in the well of the trap or out of the direct line of force of the water flushes. The conical sleeve is also extended downward below the water line to form the dip or seal Two openings only are formed in the conical sleeve the one having the largest diameter being at the top through which the water enters the trap.

The trap casing and conical sleeve constructed as described form a trap of the self cleaning type having a full bore and unobstructed way for discharges to pass through the trap in an unbroken form: the mouth of the trap is fixed direct to the vessel thus avoiding any length of inlet pipe between the vessel and trap, and also insuring that the water flushes shall pass downward through the conical sleeve and fall upon the upper surface of the water contained in the body of the trap on the inlet side with a vertical pressure acting as a plunger so as to drive everything therein contained out of the trap, and to change its previous contents entirely. The water way through the trap is not automatically opened or closed, but remains constant, always allowing free discharge to the outlet.

It being a sanitary requirement that the contents of traps should be discharged with each flush of water and that no accumulation of refuse should be allowed to collect, it is necessary that the well of the trap should be formed so as to contain as small a quantity of water as possible, consistent with a proper seal, and that the form of the trap should be of a shape approximate to a bent pipe having an enlarged mouth. It will be seen that a trap of this shape is more fully cleansed by each flush of water than a trap so shaped that the water passes through a cylindrical tube which has a smaller diameter than the body of the trap, and wherein the water flush discharges into the middle of that contained in the trap, forcing some of the contents in an opposite direction to the outlet of the trap and never entirely changing its previous contents.

For the purpose of giving convenient access to the waste pipe for cleaning, the conical sleeve is made in conjunction with the trap casing to have a slip joint which enables it to be removed and replaced as easily as an ordinary plug; the conical sleeve is thus made self-seating and adjusting, and cleaning caps fixed in the well of the trap are not required.

The trap casing and conical sleeve may be made of any suitable metal, glass, vulcanite, earthenware, stoneware, or the like. When the trap is made of metal, glass or vulcanite, the jointing of the conical sleeve with the casing is ground in; and when the trap is made of stoneware or earthenware, the joint is molded with bituminous asphalt or other suitable material. For the purpose of fixing the trap to a vessel, if required, I provide two fly nuts to be attached to the vertical screw-threaded part of the casing, one at the bottom of the vessel and one at the top, fitting into the rabbet of the orifice upon a bed of red lead or other suitable material; the bottom fly nut is screwed upward so as to compress the bottom of the vessel between the two and form a rigid fixing of the trap.

If required, inlets for overflows can be provided; such inlets may be placed either in the neck of the casing above the conical sleeve, or below into the well of the trap. A plug and grating can be fitted and attached if required.

In the accompanying drawing which illustrates the invention Figure 1 is a vertical section of the improved trap. Fig. 2 is a vertical section of the improved trap drawn at right angles to Fig. 1. Fig. 3 is a horizontal section on the line Q—R of Fig. 1, showing the hollow conical sleeve as a lining adjacent to the trap casing.

G and H are fly nuts and are adapted to be attached by a screw-threaded joint to the trap on its outside for the purpose of fixing the trap to the vessel.

I is the trap casing.
J is the hollow conical sleeve.
$B^2$ is the outlet to the waste-pipe.
K and L are the grating and plug.

I claim:—

1. The combination with a self cleansing sanitary trap casing having an opening on the top forming the mouth of the trap, and having a lateral waste pipe connection, and presenting an unobstructed way for the passage of water, of a removable dip in the form of an open-ended hollow frusto-conical sleeve forming in conjunction with the casing a self adjusting watertight slip joint, said sleeve being extended downward below the water-line to form an effective seal, a part of the outer surface of said sleeve being in contact with the interior face of the casing, and a part of the sleeve being clear of the casing and forming a partition dividing the well of the trap into two sections, and shutting off the waste-pipe connection from the mouth of the trap.

2. The combination with a sanitary trap casing, having an open top forming the mouth of the trap, and having a lateral outlet connection, of a top flange connected to the outside of the casing of the trap, a back nut for securing the trap in place, a removable open-ended frusto-conical sleeve forming in part an inner lining to the trap casing and in part an internal division between the inlet and outlet sections of the trap, the conical sleeve making a watertight joint with the casing of the trap and forming a water-seal, and a removable plug for closing the mouth of the trap, as described.

In testimony whereof I have signed my name to this specification in the presence of two subscribing witnesses.

FRED RICHARDSON.

Witnesses:
   ALFRED THOMAS BURBERY,
   FRANK W. BURBERY.